United States Patent [19]

Beagle

[11] Patent Number: 5,060,807

[45] Date of Patent: Oct. 29, 1991

[54] DISPOSABLE BOWL DISPENSER

[76] Inventor: Mark Beagle, 3250 Spottswood, Memphis, Tenn. 38111

[21] Appl. No.: 557,752

[22] Filed: Jul. 26, 1990

[51] Int. Cl.⁵ .............................................. A47G 19/08
[52] U.S. Cl. ...................................... 211/41; 211/59.3; 221/279; 221/310; 221/58
[58] Field of Search ....................... 211/41, 59.3, 49.1; 312/306, 61, 71; 108/26, 136; 221/279, 307, 310, 58, 56, 63

[56] References Cited

U.S. PATENT DOCUMENTS 1,565,306 12/1925 Bergman et al. ..................... 221/310
1,796,262 3/1931 Gaisman ............................. 221/58 X
2,426,995 9/1947 Gibbs .............................. 221/279 X
4,126,248 11/1978 House ............................. 221/279 X

*Primary Examiner*—Blair M. Johnson
*Attorney, Agent, or Firm*—Walker & McKenzie

[57] ABSTRACT

A device for storing and dispensing a number of disposable bowls comprising a disk shaped base with retaining arms and support members. Said retaining arms act to keep said disposable bowls horizontally aligned with said base and have bends at the top of each to hold said disposable bowls in the device. Said support members exert upward pressure on the underside of said disposable bowls thereby keeping said disposable bowls firmly nested against said bends at the top of each retaining arm.

1 Claim, 1 Drawing Sheet

DISPOSABLE BOWL DISPENSER

BACKGROUND

1. Field of Invention

This invention relates to pet feeding devices, specifically to a disposable bowl dispensing device for use in storing a number of disposable bowls and to facilitate easy dispensing of said bowls, providing clean bowls as needed.

2. Description of Prior Art

Heretofore the type of pet feeding device used by most consumers has consisted of a simple bowl or dish. However this type of container requires frequent scrubbing in order to provide the users pet with a clean feed receptacle. Most users, therefore, would find it desirable to have a device which could store and dispense a number of disposable bowls one at a time, thereby eliminating scrubbing and easily providing a clean feed receptacle.

OBJECTS AND ADVANTAGES

Accordingly I claim the following objects and advantages of the invention: to provide a device for easily, reliably, and neatly supplying a pet with a clean feed bowl and especially to a dispensing device so constructed as to hold a number of disposable pet bowls nested together providing easy disposal of the topmost bowl thereby exposing a clean bowl stored beneath, to provide a device which can hold a number of disposable bowls firmly in place, the device providing sufficient weight to prevent tipping of bowls when loaded and used in the invention.

In addition I claim the following additional objects and advantages: to provide a device which can dispense a number of lightweight disposable bowls one at a time, to provide such a tool which requires a minimum of skill to use, and to provide such a device which can store and dispense disposable bowls in a novel manner thereby eliminating the need to clean the bowls after use.

Readers will find further objects and advantages of the invention from a consideration of the ensuing description and the accompanying drawings.

DRAWING FIGURES

Figure 1:
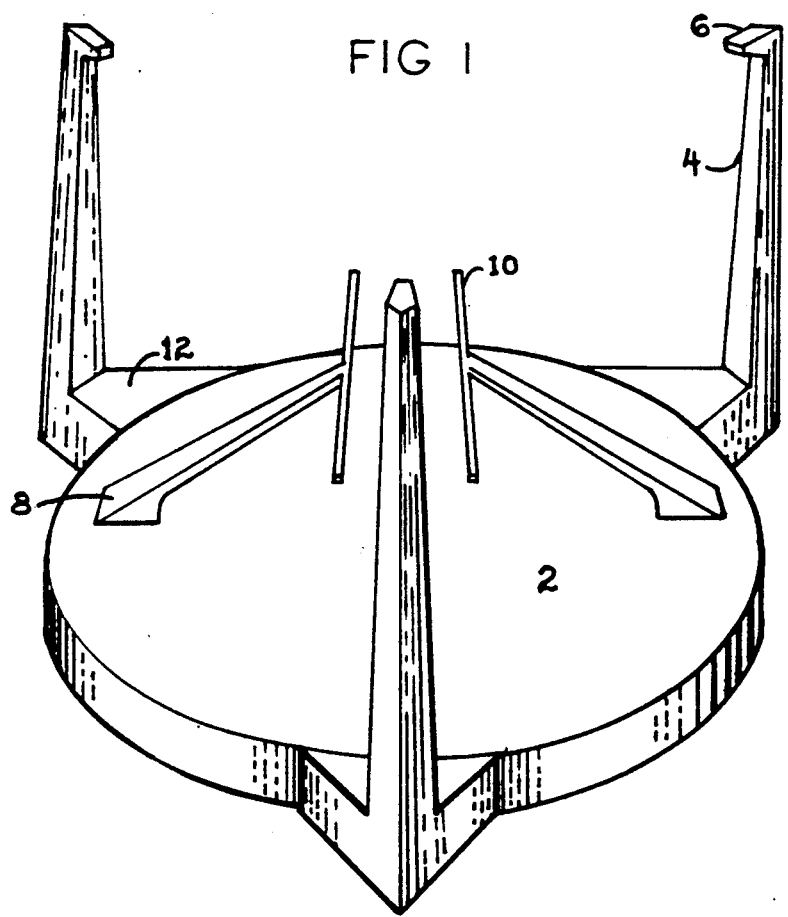
FIG. 1 shows a perspective view of the device according to the invention.
Figure 2:
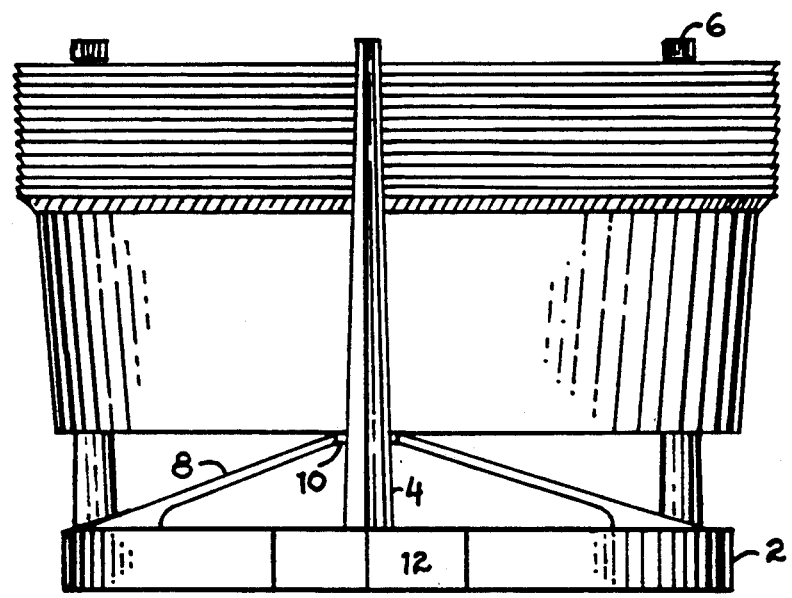
FIG. 2 shows a side view of such a device in use holding a number of disposable bowls.

DRAWING REFERENCE NUMERALS 2 base
4 retaining arms
6 bends in 4
8 support members
10 support members crossbars
12 retaining arms supports

DESCRIPTION

FIG. 1 shows a disposable bowl dispenser according to the preferred embodiment of the invention. The device comprises a base 2 which is a disk which is preferably made of molded plastic. The retaining arms 4 comprise three elongated members preferably made of molded plastic and having a bend 6 at the top of each. The retaining arms 4 are molded to the retaining arms supports 12 and project from the retaining arms supports 12 in a generally upright fashion. The retaining arms supports 12 are fixed to the base 2 being evenly spaced around the perimeter of the base 2. The two support members 8, preferably made of a flexible plastic material, are attached to the base 2 and project upwards from the base 2 at an angle of approximately forty degrees. each support member 8 has a crossbar 10 preferably made of the same material as support members 8. The support members crossbars 10 are mated at their center to the support members 8, together forming a generally tee shaped piece with the crossbars 10 being parallel to the base 2.

The base 2 and other components are sized according to the size of the disposable bowls intended for use in the device.

OPERATION

The disposable bowl dispenser of FIG. 1 will perform the function of storing and dispensing a number of disposable bowls. Users will find it useful for easily providing a pet with a clean bowl as needed.

In setting up the device for use, the user will insert a number of nested bowls into the top of the device. The bowls are pressed down into the device thereby compressing the support members 8. The support members crossbars 10 exert sufficient pressure on the underside of the nested bowls to keep the bowls firmly nested and retained by the bends 6 in the retaining arms 4.

The user will place pet food into the exposed surface of the topmost bowl. When soiled the user will remove the topmost bowl by grasping its edge and pulling it from the device thereby exposing the underlying clean bowl. when the user has used all of the inserted bowls, a new supply is placed in the device and the above process is repeated This can be performed very rapidly and neatly, eliminating scrubbing and encouraging the user to provide his pet with a clean feed bowl as needed.

While the above description contains many specificities, the reader should not construe these as limitations on the scope of the invention, but merely as exemplifications of preferred embodiments thereof. Those skilled in the art will envision many other possible variations are within its scope. For example skilled artisans will readily be able to change the proportions and shapes of the various embodiments. They will also be able to make the device of alternative materials. They will envision many variations on the size and shape of the base. The size, shape, and style of the retaining arms and the number of retaining arms used may be modified. The bend in the retaining arms can be changed or modified e.g., they can make a curved bend or other type of catch device. There are a number of possible variations on the support arms, for example a spring operated device might be used or its shape and size can be changed. Accordingly the reader is requested to determine the scope of the invention by the appended claims and their legal equivalents, and not by the examples which have been given.

I claim:

1. A pet feeding device for storing a number of disposable bowls, for holding said bowls in a stack with the topmost bowl of said stack being held so that pet food can be placed therein and so that a pet can eat directly therefrom, and for allowing said topmost bowl of said stack to be removed from said device and dispensed with, said device comprising:

(a) a base means for enabling said device to est on any generally flat surface, (b) a retaining means being adapted so as to hold said number of disposable bowls horizontally aligned to said base means and for holding said topmost bowl of said stack of bowls so that said pet food can be placed therein and so that said pet can eat directly from said topmost bowl while said stack of bowls are held by said device and for allowing said topmost bowl to be subsequently removed from said device and dispensed with, (c) a support means attached to said base so as to be usable for exertion of upward pressure on the underside of said stack of disposable bowls, said support means being made of flexible plastic and comprising two generally tee shaped members, and (d) means attached to said retaining means adapted so as to secure said number of disposable bowls in said retaining means thereby keeping said number of disposable bowls compressed against said support means.

* * * * *